(12) United States Patent
Zhou et al.

(10) Patent No.: US 12,052,203 B2
(45) Date of Patent: Jul. 30, 2024

(54) ACCESS RESOURCE DETERMINATION METHOD AND DEVICE, STORAGE MEDIUM, AND TERMINAL

(71) Applicant: SPREADTRUM COMMUNICATIONS (SHANGHAI) CO., LTD., Shanghai (CN)

(72) Inventors: Huayu Zhou, Shanghai (CN); Hualei Wang, Shanghai (CN); Zhengang Pan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 46 days.

(21) Appl. No.: 17/635,830

(22) PCT Filed: Aug. 10, 2020

(86) PCT No.: PCT/CN2020/108107
§ 371 (c)(1),
(2) Date: Feb. 16, 2022

(87) PCT Pub. No.: WO2021/031895
PCT Pub. Date: Feb. 25, 2021

(65) Prior Publication Data
US 2022/0321311 A1    Oct. 6, 2022

(30) Foreign Application Priority Data

Aug. 16, 2019  (CN) .......................... 201910766601.6
Aug. 28, 2019  (CN) .......................... 201910811278.X

(51) Int. Cl.
*H04L 5/00*  (2006.01)

(52) U.S. Cl.
CPC .......... *H04L 5/0092* (2013.01); *H04L 5/0051* (2013.01)

(58) Field of Classification Search
CPC ........................... H04L 5/0051; H04L 5/0092
See application file for complete search history.

(56) References Cited

U.S. PATENT DOCUMENTS

2018/0332505 A1   11/2018   Kim et al.
2019/0082431 A1   3/2019    Yi et al.
(Continued)

FOREIGN PATENT DOCUMENTS

| CN | 108882376 A | 11/2018 |
| CN | 109802814 A | 5/2019 |

(Continued)

OTHER PUBLICATIONS

Ericsson et al., "Discussion paper on principles for defining NR test frequencies and selecting associated parameters for SS to signal", 3GPP RAN5#80, R5-185001, Aug. 20-24, 2018, 10 pages.
(Continued)

*Primary Examiner* — Shukri Taha
(74) *Attorney, Agent, or Firm* — CANTOR COLBURN LLP

(57) ABSTRACT

An access resource determination method and device, a storage medium, and a terminal are provided. The determination method comprises: determining a frequency domain resource of a narrowband Control Resource SET0 (CORESET0), and/or determining a monitoring occasion of a narrowband Type0 Physical Downlink Control Channel (Type0-PDCCH).

17 Claims, 1 Drawing Sheet

--- a UE determines a frequency domain resource of a narrowband CORESET0, and/or determines a monitoring occasion of a narrowband Type0-PDCCH — S101 the UE receives the narrowband CORESET0 at the frequency domain resource of the narrowband CORESET0, and/or receives the narrowband Type0-PDCCH at the monitoring occasion of the narrowband Type0-PDCCH — S102

(56) References Cited

U.S. PATENT DOCUMENTS

| | | | |
|---|---|---|---|
| 2019/0159226 A1 | 5/2019 | Ly et al. | |
| 2019/0222357 A1 | 7/2019 | Huang et al. | |
| 2019/0223086 A1 | 7/2019 | Jung et al. | |
| 2020/0022168 A1* | 1/2020 | Xu | H04L 5/0053 |
| 2020/0092866 A1 | 3/2020 | Xue et al. | |
| 2020/0154380 A1* | 5/2020 | Zhou | H04L 5/0094 |
| 2020/0169956 A1* | 5/2020 | Sun | H04W 72/04 |
| 2021/0314910 A1* | 10/2021 | Rune | H04L 5/0094 |
| 2022/0078728 A1* | 3/2022 | Yi | H04W 48/16 |
| 2022/0116821 A1* | 4/2022 | Wei | H04L 27/2636 |
| 2022/0330242 A1* | 10/2022 | Zhou | H04W 48/16 |

FOREIGN PATENT DOCUMENTS

| | | |
|---|---|---|
| CN | 110062468 A | 7/2019 |
| CN | 110475361 A | 11/2019 |
| CN | 110505642 A | 11/2019 |
| IN | 109511169 A | 3/2019 |
| WO | 20190991474 A1 | 5/2019 |

OTHER PUBLICATIONS

Interdigital Inc., "Coreset Monitoring Under Dynamic Change of Bwp", 3GPP TSG RAN WG1 NR Ad-Hoc #2, RI-1710872, Jun. 27-30, 2017, 5 pages.

Parital EPO Extended European Search Report for corresponding EP Application No. 20853919.7; Dated Sep. 9, 2022.

Guangdong OPPO Mobile Telecom, "PDCCH Coreset configuration and UE procedure on NR-PDCCH", 3GPP TSG RAN WG1 meeting #89; R1-1707703; May 15-19, 2017; 7 pages.

International Search Report for International Application No. PCT/CN2020/108107; Date of Mailing, Nov. 12, 2020.

LG Electronics, "Discussion on CORESET configuration", 3GPP Tsg Ran WG1 Meeting #89; R1-1707626; May 15-19, 2017; 5 pages.

NTT Docomo, Inc., "Frequency-domain resource allocation", 3GPP TSG RAN WG1 Meeting #90; R1-1713948; Aug. 21-25, 2017; 6 pages.

Qualcomm Incorporated, "Summary of email discussion [103bis#14][NR] Channel Bandwidth Signalling (Cell Accessibility)", 3GPP TSG-RAN WG2 Meeting #104; R2-1817374; Nov. 12-16, 2018; 7 pages.

Qualcomm Incorporated, "Feature lead summery on initial access signals and channels for NR-U", 3GPP TSG RAN WG1 Meeting #96Bis; R1-1905634; Apr. 8-Apr. 12, 2019; 49 pages.

Samsung, "Corrections on Remaining Minimum System Information"; 3GPP TSG RAN WG1 Meeting AH 1801; R1-1800414; Jan. 22-26, 2018; 8 pages.

* cited by examiner

ACCESS RESOURCE DETERMINATION METHOD AND DEVICE, STORAGE MEDIUM, AND TERMINAL

CROSS-REFERENCE TO RELATED APPLICATIONS

This is the U.S. national stage of application No. PCT/CN2020/108107, filed on Aug. 10, 2020. Priority under 35 U.S.C. § 119(a) and 35 U.S.C. § 365(b) is claimed from Chinese Application No. 201910766601.6, filed Aug. 16, 2019, and Chinese Application No. 201910811278.X, filed Aug. 28, 2019, the disclosures of which are also incorporated herein by reference.

TECHNICAL FIELD

The present disclosure generally relates to radio communication technology field, and more particularly, to an access resource determination method and device, a storage medium, and a terminal.

BACKGROUND

The 3rd Generation Partnership Project (3GPP) standards organization is studying the Fifth-Generation mobile communications (5G) New Radio (NR) system. Future NR standards can support narrowband User Equipment (UE), i.e., UE with a bandwidth less than 100 MHz. This type of UE is used for Machine Type Communication (MTC) or Internet of Thing (IoT).

Generally, a UE needs to support at least a maximum bandwidth of Control Resource SET0 (CORESET0) and/or an initial active downlink Bandwidth Part (BWP). In an initial access procedure, the UE obtains the bandwidth of CORESET0 via information carried by a Physical Broadcast Channel (PBCH). CORESET0 carries Type0 Physical Downlink Control Channel (Type0-PDCCH), i.e., Remaining Minimum System Information (RMSI) PDCCH or System Information Block 1 (SIB1) PDCCH. By default, a frequency domain position of CORESET0 is equal to a frequency domain position of the initial active downlink BWP. Generally, frequency domain resources of Physical Downlink Shared Channel (PDSCH) carrying the SIB1 are within the initial active downlink BWP. Further, after the SIB1 is obtained, the initial active downlink BWP may be further expanded to obtain higher flexibility. Specifically, the expanded bandwidth of the initial active downlink BWP may be transmitted to the UE via signaling in SIB1.

SUMMARY

Embodiments of the present disclosure provide solutions for obtaining and determining a narrowband CORESET0 and/or a monitoring occasion of a narrowband Type0-PDCCH.

In an embodiment of the present disclosure, an access resource determination method is provided, including: determining a frequency domain resource of a narrowband CORESET0, and/or determining a monitoring occasion of a narrowband Type0-PDCCH.

In an embodiment of the present disclosure, a storage medium having computer instructions stored therein is provided, wherein when the computer instructions are executed, the above method is performed.

DETAILED DESCRIPTION

Figure 1:
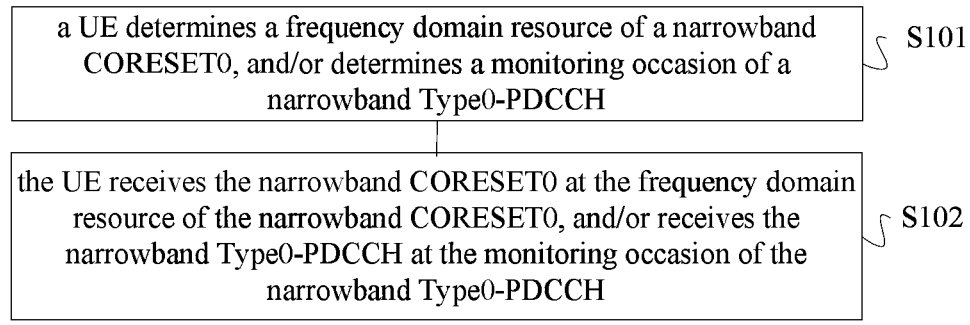
FIG. 1 is a flow chart of an access resource determination method according to an embodiment.

Existing techniques haven't provided solutions for obtaining and configuring a narrowband CORESET0 and/or a monitoring occasion of a narrowband Type0-PDCCH.

Specifically, in an NR Release 15 (Rel-15) system, synchronization signals and broadcast channel signals are sent in a form of SS/PBCH block. Functions such as beam sweeping are further introduced in 5G systems. Each SS/PBCH block can be regarded as a resource corresponding to one beam in the beam sweeping. The SS/PBCH block includes a Primary Synchronization Signal (PSS), a Secondary Synchronization Signal (SSS), and a PBCH signal. Multiple SS/PBCH blocks form a synchronization signal burst which can be regarded as a relatively concentrated resource containing multiple beams. Multiple synchronization signal bursts form a synchronization signal burst set. The SS/PBCH blocks are repeatedly sent on different beams to complete the beam sweeping. Based on training of beam sweeping, a UE can determine on which beam a strongest signal is received.

For example, it is assumed that time domain positions of L SS/PBCH blocks within a 5 millisecond (ms) window are fixed. That is, transmission occasions of the SS/PBCH blocks within the 5 ms window are fixed, and indexes thereof are also fixed. The indices of the L SS/PBCH block are arranged consecutively from 0 to (L−1) in the time domain, where L is a positive integer.

Further, RMSI is also called SIB1. RMSI in Rel-15 NR is similar to SIB1 in LTE, and includes main system information except Master Information Block (MIB). The RMSI is carried in a PDSCH scheduled through a Physical Downlink Control Channel (PDCCH). A PDSCH carrying the RMSI is generally referred to as RMSI PDSCH, and a PDCCH scheduling the RMSI PDSCH is generally referred to as RMSI PDCCH.

Generally, a search space set includes characteristics of a PDCCH, such as PDCCH monitoring occasions or a search space type. The search space set is generally associated with a CORESET which includes characteristics of the PDCCH, such as frequency domain resources and a duration.

A search space where the RMSI PDCCH (or SIB1 PDCCH, or Type0-PDCCH) is located is generally referred to as Type0-PDCCH search space set or Type0-PDCCH common search space set, and is configured by MIB, or by Radio Resource Control (RRC) in a case of handover. Generally, an Identity (ID) corresponding to the Type0-PDCCH search space set is 0, thus, it is also called search space 0 (or search space set 0). Generally, an ID corresponding to the CORESET associated with the Type0-PDCCH search space set is 0, thus, it is also called CORESET 0. Except the search space set of RMSI PDCCH, other common search spaces or common search space sets, such as search space set of Other System Information (OSI) PDCCH (Type0A-PDCCH search space set), search space set of Random Access Response (RAR) PDCCH (Type1-PDCCH search space set), search space set of paging PDCCH (Type2-PDCCH search space set), may be the same as search space set 0 by default. Generally, the above-mentioned common search spaces or common search space sets can be reconfigured.

A monitoring occasion of the RMSI PDCCH is associated with the SS/PBCH block. The UE obtains the association according to an RMSI PDCCH monitoring occasion table. In an initial access procedure, when finding a certain SS/PBCH block by searching, the UE determines a time domain position (starting symbol index or first symbol index) of an RMSI PDCCH associated with the SS/PBCH block based on a row index in a table indicated by the PBCH. In this way, the RMSI PDCCH is detected, and further an RMSI PDSCH is received and decoded based on RMSI PDCCH scheduling.

In Rel-15 NR, the UE decodes the RMSI PDCCH to obtain multiple bits allocated by time domain resources, and searches a predefined table based on the multiple bits to obtain a starting symbol index (or number) and symbol length (or duration) of the RMSI PDSCH.

In Rel-15 NR, the UE assumes that the RMSI PDSCH does not perform rate matching on an SS/PBCH block during the initial access procedure. The RMSI may indicate whether an SS/PBCH block is sent. After obtaining the RMSI, the UE may perform rate matching on the SS/PBCH block indicated by the RMSI.

The UE needs to obtain timing information via the SS/PBCH block. The timing information may be also called frame timing information, or half-frame timing information, and is generally used to indicate timing of a frame or a half-frame corresponding to a detected synchronization signal. After obtaining the frame timing information, the UE obtains complete timing information of a cell corresponding to the SS/PBCH block via System Frame Number (SFN). After obtaining the half-frame timing information, the UE obtains complete timing information of a cell corresponding to the SS/PBCH block via half-frame indication (a first half-frame or a second half-frame) and SFN.

Generally, the UE obtains timing information within 10 milliseconds by obtaining an index of an SS/PBCH block. In a licensed spectrum, the index of the SS/PBCH block is relevant to L candidate positions of the SS/PBCH block, where L is a positive integer. When L=4, lower 2 bits (2 LSBs) of the index of the SS/PBCH block are carried in PBCH Demodulation Reference Signal (PBCH-DMRS). When L>4, lower 3 bits (3 LSBs) of the index of the SS/PBCH block are carried in the PBCH-DMRS. When L=64, higher 3 bits (3 MSBs) of the index of the SS/PBCH block are carried in a PBCH payload or a MIB.

In Rel-15 NR, for a given UE, its corresponding paging occasion consists of multiple paging PDCCH monitoring occasions. In a paging occasion, a paging PDCCH may be sent by beam sweeping as the SS/PBCH block. In one paging occasion, paging PDCCH monitoring occasions correspond to SS/PBCH blocks in one-to-one correspondence, that is, in one paging occasion, a Kth paging PDCCH monitoring occasion corresponds to a Kth SS/PBCH block.

In enhanced Machine-Type Communication (eMTC) of LTE Release 13 (Rel-13), an eMTC UE is a narrowband UE. Bandwidth of the eMTC UE is about 1 MHz which can cover 6 Physical Resource Blocks (PRBs). Therefore, the eMTC UE can detect Primary Synchronization Signal (PSS)/Secondary Synchronization Signal (SSS)/Physical Broadcast Channel (PBCH) of LTE during initial access. Due to an MIB carried in the PBCH, the eMTC UE can decode the MIB of LTE. Besides, the MIB of LTE includes 10 spare bits a portion of which can be used to carry information of SIB1 (SIB1-BR, different from LTE SIB1) of scheduling eMTC. By default, a frequency domain resource of the PDSCH carrying the eMTC SIB1 is also within 6 PRBs, thus, the eMTC UE can receive the PDSCH carrying the eMTC SIB1. In this manner, after decoding the MIB of LTE, the eMTC UE obtains the eMTC SIB1 information therein to access a network.

In Release-15 NR, the UE supports a bandwidth of 100 MHz. During initial access, the UE blindly detects the PSS/SSS/PBCH in the SS/PBCH block to obtain the MIB and time index information carried in the PBCH. The UE obtains configuration of a CORESET (may be called CORESET0) and a search space set (may be called search space set 0) to which a PDCCH scheduling SIB1 (or RMSI) belongs via information in the MIB. Further, the UE can monitor and schedule Type0-PDCCH of the PDSCH carrying the SIB1, and obtain the SIB1 by decoding. As a bandwidth of CORESET0 is set through a table in the PBCH, a maximum bandwidth of CORESET0 is implicitly defined in standards. Further, the standards stipulate that frequency domain resources of the PDSCH carrying the SIB1 are within the bandwidth (PRB) of CORESET0, thus, a maximum bandwidth of the PDSCH carrying the SIB1 is also implicitly defined in the standards.

At present, for narrowband UEs, narrowband CORESET0 and/or narrowband initial active downlink BWP may need to be defined, as CORESET0 or initial active downlink BWP is not necessarily suitable for reception of the narrowband UEs. Generally, on one hand, in an initial access procedure, a bandwidth of the narrowband CORESET0 is the narrowband initial active downlink BWP by default. After obtaining additional information, the bandwidth of the narrowband initial active downlink BWP can be expanded. On the other hand, a monitoring occasion of the narrowband Type0-PDCCH may also need to be redefined, as the monitoring occasion of the narrowband Type0-PDCCH may need to be staggered from an original monitoring occasion of the Type0-PDCCH. The narrowband Type0-PDCCH refers to a PDCCH scheduling a narrowband RMSI or SIB1, or a PDCCH for the narrowband UE to receive the narrowband RMSI or SIB1. A name of the narrowband Type0-PDCCH may be Typex-PDCCH, where x is any combination of number and/or letter.

Future NR can support narrowband UEs, i.e., UEs with a bandwidth less than 100 MHz, for IoT communications. As mentioned above, the maximum bandwidth of CORESET0 is essential for the UE, as it can only be conveyed to the UE via a limited number of bits in the MIB or narrowband MIB. The maximum bandwidth of CORESET0 may exceed the maximum bandwidth supported by the narrowband UE (for example, the maximum bandwidth of CORESET0 is 20 MHz, and the maximum bandwidth supported by the narrowband UE is 10 MHz). However, the exiting techniques haven't provided solutions for the narrowband UE to obtain and configure the narrowband CORESET0 (or a CORESET of a Type0-PDCCH common search space set), and to obtain and determine a monitoring occasion of the narrowband Type0-PDCCH (or a monitoring occasion of the narrowband Type0-PDCCH common search space set).

Embodiments of the present disclosure provide an access resource determination method, including: determining a frequency domain resource of a narrowband CORESET0, and/or determining a monitoring occasion of a narrowband Type0-PDCCH. In embodiments of the present disclosure, by determining the narrowband CORESET0 or the monitoring occasion of the narrowband Type0-PDCCH, the narrowband CORESET0 or the monitoring occasion of the narrowband Type0-PDCCH is acquired so as to receive the narrowband CORESET0 or the narrowband Type0-PDCCH.

In order to clarify the objects, characteristics and advantages of the disclosure, embodiments of present disclosure will be described in detail in conjunction with accompanying drawings.

The embodiments of the present disclosure are applicable to 5G communication systems, 4G and 3G communication systems, and various communication systems evolved in the future.

The embodiments of the present disclosure are also applicable to different network architectures, including but not limited to relay network architecture, dual link architecture, and Vehicle-to-Everything.

The "plurality" in the embodiments of the present disclosure refers to two or more. It could be understood that, in various embodiments of the present disclosure, sequence numbers of each step as shown in the accompanying drawings does not mean an execution sequence, while the execution sequence of steps should be determined by functions and internal logics of the steps. The sequence numbers should not constitute any limitation on implementation of the embodiments of the present disclosure.

It should be understood that the term "and/or" in the present disclosure is merely an association relationship describing associated objects, indicating that there can be three types of relationships, for example, A and/or B can represent "A exists only, both A and B exist, B exists only. In addition, the character "I" in the present disclosure represents that the former and latter associated objects have an "or" relationship.

The descriptions of the first, second, etc. in the embodiments of the present disclosure are merely for illustrating and differentiating the objects, and do not represent the order or the particular limitation of the number of devices in the embodiments of the present disclosure, which do not constitute any limitation to the embodiments of the present disclosure.

The "connection" in the embodiments of the present disclosure refers to various connection ways such as direct connection or indirect connection to realize communication between devices, which is not limited in the embodiments of the present disclosure.

Various exemplary embodiments of the present disclosure are described in detail below with reference to accompanying drawings. The flow charts and block diagrams in the figures illustrate an architecture, functions and operations of possible implementations of the methods and systems according to various embodiments of the present disclosure. In this regard, each block in the flow charts or block diagrams may represent a module, a program segment, or a portion of instructions which includes executable instructions for implementing specified logical functions. In some embodiments, the functions noted in the blocks may occur out of an order noted in the figures. For example, two successive blocks may be executed substantially concurrently, or in a reverse order, which depends upon functions involved. It also should be noted that each block of the block diagrams and/or flow chart illustrations, and combinations of blocks in the block diagrams and/or flow charts, can be implemented by dedicated hardware-based systems that perform specified functions or actions, or by a combination of dedicated hardware and computer instructions. It also should be noted that sequence numbers of steps in the flow charts do not represent a limitation on an execution order of the steps.

FIG. 1 is a flow chart of an access resource determination method according to an embodiment. The method may be applied to a terminal side, such as a UE. The method may merely include S101, or include both S101 and S102.

In S101, a UE determines a frequency domain resource of a narrowband CORESET0, and/or determines a monitoring occasion of a narrowband Type0-PDCCH.

In S102, the UE receives the narrowband CORESET0 at the frequency domain resource of the narrowband CORESET0, and/or receives the narrowband Type0-PDCCH at the monitoring occasion of the narrowband Type0-PDCCH.

In some embodiments, a bandwidth of the narrowband CORESET0 is less than or equal to a bandwidth of a CORESET0. In S101, the UE may determine a frequency domain resource of the narrowband CORESET0, or determine a monitoring occasion of the narrowband Type0-PDCCH, or determine a frequency domain resource of the narrowband CORESET0, or determine both the monitoring occasion of the narrowband Type0-PDCCH and the monitoring occasion of the narrowband Type0-PDCCH. Generally, a frequency domain position and bandwidth of the CORESET0 are equal to a frequency domain position and bandwidth of an initial active downlink BWP, and a frequency domain position and bandwidth of the narrowband CORESET0 are equal to a frequency domain position and bandwidth of a narrowband initial active downlink BWP. Therefore, determining the frequency domain resource of the narrowband CORESET0 is equal to determining a frequency domain resource of the narrowband initial active downlink BWP.

In some embodiments, the narrowband CORESET0 may have a preset association relation with an access resource of the narrowband UE. In some embodiments, the preset association relation may include: a lowest PRB of the narrowband CORESET0 is equal to a lowest PRB of the CORESET0. Alternatively, an offset between the lowest PRB of the narrowband CORESET0 and the lowest PRB of the CORESET0 is a preset value which is associated with bandwidth. Based on the preset association relation, the narrowband UE may determine the frequency domain position of the narrowband CORESET0. In some embodiments, the lowest PRB of the SS/PBCH block may be a lowest PRB that overlaps with the lowest PRB of the SS/PBCH block in a Common Resource Block (Common RB). Sometimes, the actually lowest sub-carrier of the SS/PBCH block may have a sub-carrier level offset from a lowest sub-carrier of the above-mentioned lowest PRB of the SS/PBCH block. In the embodiments of the present disclosure, the frequency domain offset between any frequency domain resource (such as CORESET0, narrowband CORESET0, or initial active downlink BWP) and the SS/PBCH block may refer to an offset between the lowest PRB of the frequency domain resource and the lowest PRB in the Common RB which is overlapped with the lowest PRB of the SS/PBCH block.

In some embodiments, the bandwidth of the offset is greater than or equal to the bandwidth of the narrowband CORESET0. Alternatively, a number of PRBs included in the offset is greater than or equal to a number of PRBs included in the narrowband CORESET0.

In some embodiments, the UE may receive offset relevant information delivered by a base station. In some embodiments, the UE may obtain from the base station the offset between the narrowband CORESET0 and the SS/PBCH block, or the offset between the narrowband CORESET0 and the CORESET0, or both the offset between the narrowband CORESET0 and the SS/PBCH block, and the offset between the narrowband CORESET0 and the CORESET0.

In some embodiments, the offset may be included in a CORESET0 table of existing standards, for example, a CORESET0 table included in Release 15 (Rel-15) or Release 16 (Rel-16). Alternatively, the offset may be included in an expanded CORESET0 table which carries the offset and may be a table newly added in the standards to carry the narrowband CORESET0. For the CORESET0 table and the expanded CORESET0 table, the base station can use the same PBCH to indicate rows in the CORESET0 table and the expanded CORESET0 table, that is, for indication of the same PBCH, the non-narrowband UE searches the CORESET0 table, while the narrowband UE searches the expanded CORESET0 table.

In some embodiments, if the bandwidth of the narrowband CORESET0 is less than or equal to the preset bandwidth, the offset in the expanded CORESET0 table is equal to the offset in the CORESET0 table. In some embodiments, if the bandwidth of the narrowband CORESET0 is less than or equal to the preset bandwidth, the offset is the offset in the CORESET0 table. In these embodiments, a maximum bandwidth supported by the narrowband UE is greater than or equal to the preset bandwidth. In this case, the CORESET0 deployed by a base station in a carrier is equal to the narrowband CORESET0, that is, the narrowband UE and the non-narrowband UE are configured with the same CORESET0.

In some embodiments, the offset is included in a reserved field or codepoint in the PBCH.

Further, if the narrowband UE is located in Frequency Range 1 (FR1), the base station may place the offset in the PBCH to be carried by an SS/PBCH block index in the PBCH. For FR1, the SS/PBCH block index in the PBCH is a reserved bit and not used to indicate the SS/PBCH block index.

Alternatively, if the narrowband UE is located in Frequency Range 2 (FR2), the base station may carry the offset in monitoring occasion indication of the Type0-PDCCH. Generally, the monitoring occasion indication of the Type0-PDCCH includes 4 bits carried in the PBCH, and is defined by a table. In some embodiments, if a multiplexing mode of the SS/PBCH block and CORESET is 2 or 3, the monitoring occasion indication of the Type0-PDCCH may be equivalent to a monitoring occasion table of the Type0-PDCCH, as 3 bits are reserved in the monitoring occasion indication of the Type0-PDCCH for indicating the offset. In some embodiments, if a multiplexing mode of the SS/PBCH block and CORESET is 2 or 3, the monitoring occasion indication of the Type0-PDCCH may be equivalent to a monitoring occasion table of the narrowband Type0-PDCCH, as the SS/PBCH block and the monitoring occasion of the Type0-PDCCH are consistent in time in this case, and the monitoring occasion table of the narrowband Type0-PDCCH can be equivalent to the monitoring occasion table of the Type0-PDCCH.

Alternatively, if a multiplexing mode of the SS/PBCH block and CORESET is 2, the offset may be carried by the monitoring occasion indication of the Type0-PDCCH. Specifically, if the multiplexing mode of the SS/PBCH block and CORESET is 2, as 3 bits are reserved in the monitoring occasion indication of the Type0-PDCCH, these 3 bits can be used to indicate the offset.

Alternatively, if a multiplexing mode of the SS/PBCH block and CORESET is 3, the offset may be carried by the monitoring occasion indication of the Type0-PDCCH. Specifically, if the multiplexing mode of the SS/PBCH block and CORESET is 3, as 3 bits are reserved in the monitoring occasion indication of the Type0-PDCCH, these 3 bits can be used to indicate the offset.

In some embodiments, the UE may obtain a time slot index of the monitoring occasion of the narrowband Type0-PDCCH based on a time offset between a start time slot of the SS/PBCH block and a start time slot of the monitoring occasion of the narrowband Type0-PDCCH. In some embodiments, said obtaining a time slot index of the monitoring occasion of the narrowband Type0-PDCCH includes obtaining a start time slot index of the monitoring occasion of the narrowband Type0-PDCCH.

In some embodiments, the time offset is included in a Type0-PDCCH monitoring occasion table, or the time offset is included in an expanded Type0-PDCCH monitoring occasion table which may be used to store the time offset.

In Release 15 NR, when a multiplexing mode of the SS/PBCH block and CORESET is 1, an index of the start slot of the monitoring occasion of the Type0-PDCCH is $n_0 = (O \cdot 2^\mu + \lfloor i \cdot M \rfloor) \bmod N_{slot}^{frame,\mu}$, where i is an index of the SS/PBCH block, $\mu$ is a parameter of a subcarrier spacing of the PDCCH (for example, when the subcarrier spacing is 15 kHz, 30 kHz, 60 kHz and 120 kHz, $\mu$ is 0, 1, 2 and 3, respectively), O is a time offset between a start time slot of the SS/PBCH block and a start time slot of the monitoring occasion of the Type0-PDCCH, or a time offset between a start time slot of a first SS/PBCH block and a start time slot of a monitoring occasion of a first Type0-PDCCH (the "first" here refers to the first one in a half of a radio frame or within a window of 5 ms), $O \cdot 2^\mu$ is a number of time slot offsets between the start time slot of the SS/PBCH block and the start time slot of the monitoring occasion of the Type0-PDCCH, $N_{slot}^{frame,\mu}$ is a total number of time slots within a frame (radio frame), mod represents an operation of taking a modulo or obtaining a remainder, and M is a reciprocal of the number of monitoring occasions of the Type0-PDCCH in a time slot and is generally ½, 1 or 2. When M=½, it indicates that the number of monitoring occasions of the Type0-PDCCH in a time slot is 2; when M=1, it indicates that the number of monitoring occasions of the Type0-PDCCH in a time slot is 1; when M=2, it indicates that the number of monitoring occasions of the Type0-PDCCH in one time slot is ½, or there is one monitoring occasion of the Type0-PDCCH in two time slots.

When the narrowband Type0-PDCCH and Type0-PDCCH that the narrowband UE needs to monitor are staggered in time, the time offset between the start time slot of the SS/PBCH block and the start time slot of the monitoring occasion of the narrowband Type0-PDCCH is a new time offset, for example, $O_2$, different from the parameter O in the standards. In this case, the start time slot of the monitoring occasion of the narrowband Type0-PDCCH is $n_0 = (O \cdot 2^\mu + \lfloor i \cdot M \rfloor) \bmod N_{slot}^{frame,\mu}$, where i is the index of the SS/PBCH block, and $\mu$ is the parameter of the subcarrier spacing of the PDCCH (for example, when the subcarrier interval is 15 kHz, 30 kHz, 60 kHz and 120 kHz, $\mu$ is 0, 1, 2 and 3, respectively), $O_2$ is a time offset between a start time slot of the SS/PBCH block and a start time slot of the monitoring occasion of the narrowband Type0-PDCCH, or a time offset between a start time slot of a first SS/PBCH block and a start time slot of a monitoring occasion of a first narrowband Type0-PDCCH (the "first" here refers to the first one in a half of a radio frame or within a window of 5 ms), $O_2 \cdot 2^\mu$ is a number of time slot offsets between the start time slot of the SS/PBCH block and the start time slot of the monitoring occasion of the narrowband Type0-PDCCH, $N_{slot}^{frame,\mu}$ is a total number of time slots within a frame (radio frame), and mod is an operation of taking a modulo or obtaining a remainder.

In some embodiments, if a bandwidth of the narrowband CORESET0 is less than or equal to a preset bandwidth, the time offset in the expanded Type0-PDCCH monitoring occasion table is equal to the time offset in the Type0-PDCCH monitoring occasion table. In some embodiments, if the bandwidth of the narrowband CORESET0 is less than or equal to the preset bandwidth, the offset is the offset in the CORESET0 table. In these embodiments, a maximum bandwidth supported by the narrowband UE is greater than or equal to the preset bandwidth. In this case, the monitoring occasion of the Type0-PDCCH deployed by a base station in a carrier is equal to the monitoring occasion of the narrowband Type0-PDCCH, namely, the narrowband UE and the non-narrowband UE are configured with the same monitoring occasion of the Type0-PDCCH.

In some embodiments, the time offset is a time corresponding to a sum of a first offset and a first duration, the first offset is a number of time slot offsets between the start time slot of the SS/PBCH block and the start time slot of the monitoring occasion of the Type0-PDCCH or a number of time slot offsets between the start time slot of the first SS/PBCH block and the start time slot of the monitoring occasion of the first Type0-PDCCH, and the first duration is time corresponding to a total number of timeslots of the monitoring occasion of the Type0-PDCCH associated with a maximum number of SS/PBCH blocks. That is, $O_2 \cdot 2^\mu = (O \cdot 2^\mu + \lfloor L_{max} \cdot M \rfloor)$, where $O \cdot 2^\mu$ is a number of time slot offsets between the start time slot of the SS/PBCH block and the start time slot of the monitoring occasion of the Type0-PDCCH or a number of time slot offsets between the start time slot of the first SS/PBCH block and the start time slot of the monitoring occasion of the first Type0-PDCCH, $\lfloor L_{max} \cdot M \rfloor$ is the total number of timeslots of the monitoring occasion of the Type0-PDCCH associated with the maximum number of SS/PBCH blocks, $L_{max}$ is the maximum number, $O_2 \cdot 2^\mu$ is the time offset (corresponding number of time slots). For example, if $L_{max}=8$, the total number of timeslots of the monitoring occasion of the Type0-PDCCH associated with the maximum number of SS/PBCH blocks is the total number of timeslots of the monitoring occasion of the Type0-PDCCH associated with eight SS/PBCH blocks. If M=½, the total number of timeslots of the monitoring occasion of the Type0-PDCCH associated with eight SS/PBCH blocks is four. If M=2, the total number of timeslots of the monitoring occasion of the Type0-PDCCH associated with eight SS/PBCH blocks is sixteen. A reciprocal M of the number of monitoring occasions of the Type0-PDCCH in a time slot is 1 or ½. If M=½, the maximum number of SS/PBCH blocks is $L_{max}$, and the number of the monitoring occasions of the Type0-PDCCH associated with the maximum number of SS/PBCH blocks is $\lfloor L_{max}/2 \rfloor$. If M=1, the maximum number of SS/PBCH blocks is $L_{max}$, and the number of the monitoring occasions of the Type0-PDCCH associated with the maximum number of SS/PBCH blocks is $L_{max}$. If M=2, the maximum number of SS/PBCH blocks is $L_{max}$, and the number of the monitoring occasions of the Type0-PDCCH associated with the maximum number of SS/PBCH blocks is $2L_{max}$. In some embodiments, the time offset is greater than the time corresponding to the sum of the first offset and the first duration. In this manner, flexibility of network deployment may be improved.

In some embodiments, the time offset is a sum of a time offset between the start time slot of the SS/PBCH block and the start time slot of the monitoring occasion of the Type0-PDCCH, and a time corresponding to a total number of timeslots of the monitoring occasion of the Type0-PDCCH associated with a maximum number of SS/PBCH blocks. In some embodiments, the time offset is a sum of a time offset between the start time slot of the first SS/PBCH block and the start time slot of the monitoring occasion of the first Type0-PDCCH, and a time corresponding to a total number of timeslots of the monitoring occasion of the Type0-PDCCH associated with a maximum number of SS/PBCH blocks. That is, $O_2 = (O + \lfloor L_{max} \cdot M \rfloor/2^\mu)$, where O is the time offset between the start time slot of the SS/PBCH block and the start time slot of the monitoring occasion of the Type0-PDCCH, or the time offset between the start time slot of the first SS/PBCH block and the start time slot of the monitoring occasion of the first Type0-PDCCH, $\lfloor L_{max} \cdot M \rfloor/2^\mu$ is the time corresponding to the total number of timeslots of the monitoring occasion of the Type0-PDCCH associated with a maximum number of SS/PBCH blocks, $L_{max}$ is the maximum number $O_2$ is the time offset. A reciprocal M of the number of monitoring occasions of the Type0-PDCCH in a time slot is 1 or ½. If M=½, the maximum number of SS/PBCH blocks is $L_{max}$, and the number of the monitoring occasions of the Type0-PDCCH associated with the maximum number of SS/PBCH blocks is $\lfloor L_{max}/2 \rfloor$ If M=1, the maximum number of SS/PBCH blocks is $L_{max}$, and the number of the monitoring occasions of the Type0-PDCCH associated with the maximum number of SS/PBCH blocks is $L_{max}$. If M=2, the maximum number of SS/PBCH blocks is $L_{max}$, and the number of the monitoring occasions of the Type0-PDCCH associated with the maximum number of SS/PBCH blocks is $2L_{max}$. In some embodiments, the time offset is greater than the sum of the time offset between the start time slot of the SS/PBCH block and the start time slot of the monitoring occasion of the Type0-PDCCH, and the time corresponding to the total number of timeslots of the monitoring occasion of the Type0-PDCCH associated with the maximum number of SS/PBCH blocks, or the sum of the time offset between the start time slot of the first SS/PBCH block and the start time slot of the monitoring occasion of the first Type0-PDCCH, and the time corresponding to the total number of timeslots of the monitoring occasion of the Type0-PDCCH associated with the maximum number of SS/PBCH blocks. In this manner, flexibility of network deployment may be improved.

In some embodiments, the time offset is a time offset between a start time slot of an SS/PBCH block and a start time slot of the monitoring occasion of the Type0-PDCCH, or a time offset between a start time slot of a first SS/PBCH block and a start time slot of a monitoring occasion of a first Type0-PDCCH, and a time slot index of the monitoring occasion of the narrowband Type0-PDCCH is equal to a time slot index of the monitoring occasion of the Type0-PDCCH plus one. That is, $O_2 = O$. A reciprocal M of the number of monitoring occasions of the Type0-PDCCH in a time slot is 2. In this case, there is only one monitoring occasion of the Type0-PDCCH every two time slots, thus, a monitoring occasion of the narrowband Type0-PDCCH can be inserted in every two time slots.

Further, referring to FIG. 1, in S102, the UE may receive the narrowband CORESET0 in the frequency domain resource of the narrowband CORESET0, and/or receive the Type0-PDCCH at the monitoring occasion of the Type0-PDCCH.

In some embodiments, the PBCH indicates whether the narrowband CORESET0 and/or the narrowband Type0-PDCCH exists. In this way, the reception of the PBCH by the non-narrowband UE may not be affected. In some embodiments, a reserved bit in the PBCH indicates whether the narrowband CORESET0 and/or the narrowband Type0-PDCCH exists. In this way, the PBCH can be received by non-narrowband UEs and narrowband UEs, which is relatively compatible.

When the bandwidth supported by the narrowband UE is less than the maximum bandwidth of CORESET0, the narrowband UE may determine the frequency domain resource of the narrowband CORESET0 and/or the monitoring occasion of the Type0-PDCCH based on following embodiments.

In the below embodiment, the frequency domain resource of the narrowband CORESET0 is determined.

For the bandwidth of the narrowband CORESET0, by default, the narrowband UE assumes that the bandwidth of the narrowband CORESET0 is a preset value associated with a frequency band that needs to be accessed.

In a first solution, by default, a lowest PRB of the narrowband CORESET0 is a lowest PRB of the CORESET0. The first solution is suitable for a situation where there are many time-frequency resources of the CORESET0, as some resources of the CORESET0 may be occupied by the narrowband CORESET0 at this time, and the number of Type0-PDCCH candidates in the CORESET0 may be reduced.

In a second solution, by default, an offset between the lowest PRB of the narrowband CORESET0 and the lowest PRB of the CORESET0 is a preset value. A bandwidth corresponding to the preset value is greater than or equal to the bandwidth of the narrowband CORESET0. That is, corresponding to a certain subcarrier spacing, the number of PRBs under the bandwidth corresponding to the preset value is greater than or equal to the number of PRBs under the bandwidth of the narrowband CORESET0. The second solution is suitable for a situation where time-frequency resources of the PDCCH are few while frequency domain resources of the PDCCH are more.

In a third solution, the narrowband UE obtains the position of the narrowband CORESET0 by obtaining the offset between the SS/PBCH block and the narrowband CORESET0, or by obtaining the offset between the CORESET0 and the narrowband CORESET0. More specifically, the narrowband UE obtains the position of the lowest PRB of the narrowband CORESET0 by obtaining the offset between the lowest PRB of the SS/PBCH block/CORESET0 and the lowest PRB of the narrowband CORESET0.

In this case, the narrowband UE may obtain offset information via a CORESET0 table of Rel-15/Rel-16. An advantage lies in that no new (expanded) CORESET0 table (i.e., the expanded CORESET0 table) is required, and a disadvantage lies in that the non-narrowband UE also uses the narrowband CORESET0.

Alternatively, the narrowband UE obtains the offset information via a new (expanded) CORESET0 table. An advantage lies in that the non-narrowband UE can use the CORESET0. However, by default, for narrowband UEs and non-narrowband UEs that find the same SS/PBCH block by searching and decode the same MIB information, as bits indicated by the received MIB are the same, rows of the same index in the expanded CORESET0 table and the original CORESET0 table are the same. That is, once selecting certain CORESET0 configuration, a network also selects narrowband CORESET0 configuration corresponding to the same row.

Alternatively, when the bandwidth in the original CORESET0 table is less than or equal to the preset bandwidth (such as the maximum bandwidth supported by the narrowband UE), the narrowband UE obtains the offset information based on the original CORESET0 table. If the bandwidth in the original CORESET0 table is greater than the preset bandwidth, the narrowband UE obtains the offset information based on a new (expanded) CORESET0 table. In this way, only under certain cases does the network need to deploy the narrowband CORESET0, and it is required to indicate the narrowband CORESET0 based on a new (expanded) CORESET0 table.

Alternatively, the narrowband UE obtains the offset information through some reserved fields or codepoints. As the SS/PBCH block of Rel-15/Rel-16 is reused, the offset information needs to be transmitted through reserved bits or reserved codepoints in the SS/PBCH block.

For a FR1, the narrowband UE may obtain the offset by obtaining the SS/PBCH block index (i.e., upper 3 bits of an SS/PBCH block time index, 3 MSBs) within the PBCH. For a FR2, the narrowband UE may obtain the offset by obtaining Type0-PDCCH monitoring occasion indication (i.e., reserved bits or codepoints).

In one example, when a multiplexing mode of the SS/PBCH block and CORESET in FR2 is 2, the Type0-PDCCH monitoring occasion indication indicates the offset. In another example, when a multiplexing mode of the SS/PBCH block and CORESET in FR2 is 3, the Type0-PDCCH monitoring occasion indication indicates the offset. When a multiplexing mode of the SS/PBCH block and CORESET in FR2 is 2 or 3, the monitoring occasion indication of the Type0-PDCCH may be equivalent to a monitoring occasion table of the Type0-PDCCH, as 3 bits are reserved in the monitoring occasion indication of the Type0-PDCCH for indicating the offset.

In the below embodiment, the monitoring occasion of the narrowband Type0-PDCCH is determined.

The narrowband UE obtains a time slot index of the monitoring occasion of the narrowband Type0-PDCCH, by obtaining a time offset between a start time slot of an SS/PBCH block and a start time slot of the monitoring occasion of the narrowband Type0-PDCCH, or by obtaining a time offset between a start time slot of a first SS/PBCH block and a start time slot of a monitoring occasion of a first narrowband Type0-PDCCH. In some embodiments, said obtains the time slot index of the monitoring occasion of the narrowband Type0-PDCCH is to obtain the start time slot index corresponding to the monitoring occasion of the narrowband Type0-PDCCH.

In some embodiments, the narrowband UE may obtain the time offset information based on the existing Type0-PDCCH monitoring occasion table of Rel-15/Rel-16. This solution is suitable for a situation where the CORESET0 and the narrowband CORESET0 do not overlap.

In some embodiments, the narrowband UE may obtain the time offset information based on a new (expanded) Type0-PDCCH monitoring occasion table (i.e., the expanded Type0-PDCCH monitoring occasion table). This solution is suitable for a situation where the CORESET0 and the narrowband CORESET0 overlap.

In the new (expanded) Type0-PDCCH monitoring occasion table, when M=1 or ½, the time offset is a time corresponding to a sum of a number of time slot offsets between the start time slot of the SS/PBCH block and the start time slot of the monitoring occasion of the Type0-PDCCH, and a total number of timeslots of the monitoring occasion of the Type0-PDCCH associated with a maximum number of SS/PBCH blocks. When M=2, the time offset is a time offset between the start time slot of the SS/PBCH block and the start time slot of the monitoring occasion of the Type0-PDCCH, or a time offset between the start time slot of the first SS/PBCH block and the start time slot of the monitoring occasion of the first Type0-PDCCH. The time slot index or start time slot index of the monitoring occasion of the narrowband Type0-PDCCH is equal to a time slot index or start time slot index of the monitoring occasion of the Type0-PDCCH plus one. M is a reciprocal of a number of monitoring occasions of the Type0-PDCCH in a time slot.

In some embodiments, when the bandwidth in the original CORESET0 table is less than or equal to the preset bandwidth (such as the maximum bandwidth supported by the narrowband UE), the narrowband UE obtains the time offset information based on the original Type0-PDCCH monitoring occasion table. If the bandwidth in the original CORESET0 table is greater than the preset bandwidth, the narrowband UE obtains the time offset information based on a new (expanded) Type0-PDCCH monitoring occasion table. In this way, only under certain cases does the network need to deploy the narrowband CORESET0 and the corresponding Type0-PDCCH, and it is required to indicate the narrowband CORESET0 and the corresponding Type0-PDCCH based on a new (expanded) CORESET0 table.

In the new (expanded) Type0-PDCCH monitoring occasion table, when M=1 or ½, the time offset is a time corresponding to a sum of a number of time slot offsets between the start time slot of the SS/PBCH block and the start time slot of the monitoring occasion of the Type0-PDCCH, and a total number of timeslots of the monitoring occasion of the Type0-PDCCH associated with a maximum number of SS/PBCH blocks, or a sum of a number of time slot offsets between the start time slot of the first SS/PBCH block and the start time slot of the monitoring occasion of the first Type0-PDCCH, and a total number of timeslots of the monitoring occasion of the Type0-PDCCH associated with a maximum number of SS/PBCH blocks. When M=2, the time offset is a time offset between the start time slot of the SS/PBCH block and the start time slot of the monitoring occasion of the Type0-PDCCH, or a time offset between the start time slot of the first SS/PBCH block and the start time slot of the monitoring occasion of the first Type0-PDCCH. The time slot index or start time slot index of the monitoring occasion of the narrowband Type0-PDCCH is equal to a time slot index or start time slot index of the monitoring occasion of the Type0-PDCCH plus one.

From above, embodiments of the present disclosure provide feasible solutions for determining the access resource of the narrowband UE to further obtain and configure the narrowband CORESET0 and determine the monitoring occasion of the narrowband Type0-PDCCH.

Figure 2:
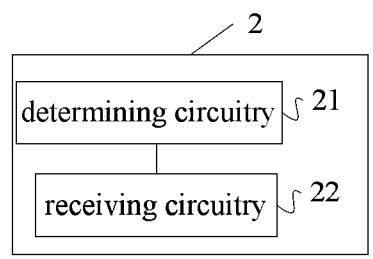
FIG. 2 is a structural diagram of an access resource determination device according to an embodiment.

Referring to FIG. 2, FIG. 2 is a structural diagram of an access resource determination device according to an embodiment. The access resource determination device 2 may be configured to perform the method as shown in FIG. 1, and applied to a UE.

The access resource determination device 2 may include a determining circuitry 21 configured to determine a frequency domain resource of a narrowband CORESET0, and/or determine a monitoring occasion of a narrowband Type0-PDCCH.

In some embodiments, a lowest PRB of the narrowband CORESET0 is equal to a lowest PRB of the CORESET0.

In some embodiments, an offset between a lowest PRB of the narrowband CORESET0 and a lowest PRB of the CORESET0 is a preset value.

In some embodiments, a bandwidth of the offset is greater than or equal to a bandwidth of the narrowband CORESET0.

In some embodiments, a number of PRBs included in the offset is greater than or equal to a number of PRBs included in the narrowband CORESET0.

In some embodiments, the access resource determination device 2 further includes an obtaining circuitry (not shown) configured to obtain an offset between the narrowband CORESET0 and the SS/PBCH block, and/or obtain an offset between the narrowband CORESET0 and a CORESET0.

In some embodiments, the offset is an offset between a lowest PRB of the SS/PBCH block and a lowest PRB of the narrowband CORESET0, or the offset is an offset between a lowest PRB of the CORESET0 and a lowest PRB of narrowband CORESET0.

In some embodiments, the offset is included in a CORESET0 table, or an expanded CORESET0 table.

In some embodiments, if a bandwidth of the narrowband CORESET0 is less than or equal to a preset bandwidth, the offset in the expanded CORESET0 table is equal to the offset in the CORESET0 table.

In some embodiments, the offset is included in a reserved field or a codepoint in a PBCH.

In some embodiments, if the offset is located in a FR1, the offset is carried in an SS/PBCH block index in a PBCH.

In some embodiments, if the offset is located in a FR2, the offset is carried in monitoring occasion indication of the Type0-PDCCH.

In some embodiments, if a multiplexing mode of the SS/PBCH block and CORESET is 2, the offset is carried in monitoring occasion indication of the Type0-PDCCH.

In some embodiments, if a multiplexing mode of the SS/PBCH block and CORESET is 3, the offset is carried in monitoring occasion indication of the Type0-PDCCH.

In some embodiments, the determining circuitry 21 includes an obtaining sub-circuitry (not shown) configured to obtain a time slot index of the monitoring occasion of the narrowband Type0-PDCCH, based on a time offset between a start time slot of an SS/PBCH block and a start time slot of the monitoring occasion of the narrowband Type0-PDCCH, or a time offset between a start time slot of a first SS/PBCH block and a start time slot of a monitoring occasion of a first narrowband Type0-PDCCH.

In some embodiments, a time slot index of the monitoring occasion of the narrowband Type0-PDCCH is a start time slot index of the monitoring occasion of the narrowband Type0-PDCCH.

In some embodiments, the time offset is included in a Type0-PDCCH monitoring occasion table, or the time offset is included in an expanded Type0-PDCCH monitoring occasion table.

In some embodiments, if a bandwidth of the narrowband CORESET0 is less than or equal to a preset bandwidth, the time offset in the expanded Type0-PDCCH monitoring occasion table is equal to the time offset in the Type0-PDCCH monitoring occasion table.

In some embodiments, the time offset is a time corresponding to a sum of a first offset and a first duration, the first offset is a number of time slot offsets between the start time slot of the SS/PBCH block and the start time slot of the monitoring occasion of the Type0-PDCCH or a number of time slot offsets between the start time slot of the first SS/PBCH block and the start time slot of the monitoring occasion of the first Type0-PDCCH, and the first duration is a total number of timeslots of the monitoring occasion of the Type0-PDCCH associated with a maximum number of SS/PBCH blocks.

In some embodiments, if a reciprocal of a number of monitoring occasions of the Type0-PDCCH in a time slot is 1 or ½, the time offset is a time corresponding to a sum of a first offset and a first duration, the first offset is a number of time slot offsets between the start time slot of the SS/PBCH block and the start time slot of the monitoring occasion of the Type0-PDCCH or a number of time slot offsets between the start time slot of the first SS/PBCH block and the start time slot of the monitoring occasion of the first Type0-PDCCH, and the first duration is a total number of timeslots of the monitoring occasion of the Type0-PDCCH associated with a maximum number of SS/PBCH blocks.

In some embodiments, the time offset is equal to a time offset between the start time slot of the SS/PBCH block and a start time slot of a monitoring occasion of a Type0-PDCCH, or a time offset between the start time slot of the first SS/PBCH block and a start time slot of a monitoring occasion of a first Type0-PDCCH, and the time slot index or start time slot index of the monitoring occasion of the narrowband Type0-PDCCH is equal to a time slot index or start time slot index of the monitoring occasion of the Type0-PDCCH plus one.

In some embodiments, if a reciprocal of a number of monitoring occasions of the Type0-PDCCH in a time slot is 2, the time offset is equal to a time offset between the start time slot of the SS/PBCH block and a start time slot of a monitoring occasion of a Type0-PDCCH, or a time offset between the start time slot of the first SS/PBCH block and a start time slot of a monitoring occasion of a first Type0-PDCCH, and the time slot index or start time slot index of the monitoring occasion of the narrowband Type0-PDCCH is equal to a time slot index or start time slot index of the monitoring occasion of the Type0-PDCCH plus one.

In some embodiments, the access resource determination device 2 further includes a receiving circuitry 22 configured to receive the narrowband CORESET0 at the frequency domain resource of the narrowband CORESET0, and/or receive the narrowband Type0-PDCCH at the monitoring occasion of the narrowband Type0-PDCCH.

In some embodiments, the access resource determination device 2 further includes an indicating circuitry (not shown) configured to indicate presence of the narrowband CORESET0 and/or the narrowband Type0-PDCCH in a PBCH.

More details of principles, implementation and advantages of the access resource determination device 2 can be found in the above descriptions of FIG. 1, and are not described here.

In an embodiment of the present disclosure, a storage medium having computer instructions stored therein is provided, wherein when the computer instructions are executed, the above method as shown in FIG. 1 is performed. In some embodiments, the storage medium may be a computer readable storage medium, such as a non-volatile memory or a non-transitory memory, or may include an optical disk, a mechanical hard disk or a solid state disk.

In an embodiment of the present disclosure, a terminal including a memory and a processor is provided, wherein the memory has computer instructions stored therein, and when the processor executes the computer instructions, the method as shown in FIG. 1 is performed.

The terminal in the embodiments of the present disclosure may refer to various forms of UE, access terminal, user unit, user station, Mobile Station (MS), remote station, remote terminal, mobile equipment, user terminal, terminal equipment, wireless communication equipment, user agent or user device. The terminal may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory, or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

It should be understood that, in the various embodiments of the present disclosure, sequence numbers of the above-mentioned processes do not represent an execution sequence, and the execution sequence of each process should be determined by its function and inherent logic, which does not limit an implementation process of the embodiments of the present disclosure.

In the above embodiments of the present disclosure, it should be understood that the disclosed method, device and system may be implemented in other ways. For example, the above device embodiments are merely illustrative, and for example, division of units is merely one logical division, and other divisions may be realized in practice, for example, a plurality of units or components may be combined or integrated into another system, or some features may be omitted, or not executed. Further, the shown or discussed mutual coupling or direct coupling or communication connection may be an indirect coupling or communication connection via some interfaces, devices or units, and may be in an electrical, mechanical or other form.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:
1. An access resource determination method, performed by a User Equipment (UE) and comprising:
obtaining an offset between a narrowband Control Resource SET0 (CORESET0) and a CORESET0; and
determining a frequency domain resource of the narrowband CORESET0 according to the offset;

wherein the offset is an offset between a lowest PRB of the CORESET0 and a lowest PRB of narrowband CORESET0.

2. The method according to claim 1, wherein a lowest Physical Resource Block (PRB) of the narrowband CORESET0 is equal to a lowest PRB of the CORESET0.

3. The method according to claim 1, wherein an offset between a lowest PRB of the narrowband CORESET0 and a lowest PRB of the CORESET0 is a preset value.

4. The method according to claim 1, wherein the offset is included in a CORESET0 table, or an expanded CORESET0 table.

5. The method according to claim 4, wherein based on that a bandwidth of the narrowband CORESET0 is less than or equal to a preset bandwidth, the offset in the expanded CORESET0 table is equal to the offset in the CORESET0 table.

6. The method according to claim 1, wherein the offset is included in a reserved field or a codepoint in a Physical Broadcast Channel (PBCH).

7. The method according to claim 1, comprising determining a monitoring occasion of a narrowband Type0-PDCCH, wherein said determining a monitoring occasion of a narrowband Type0-PDCCH comprises:
obtaining a time slot index of the monitoring occasion of the narrowband Type0-PDCCH, based on a time offset between a start time slot of an SS/PBCH block and a start time slot of the monitoring occasion of the narrowband Type0-PDCCH, or a time offset between a start time slot of a first SS/PBCH block and a start time slot of a monitoring occasion of a first narrowband Type0-PDCCH.

8. The method according to claim 7, wherein said obtaining a time slot index of the monitoring occasion of the narrowband Type0-PDCCH comprises obtaining a start time slot index of the monitoring occasion of the narrowband Type0-PDCCH.

9. The method according to claim 7, wherein the time offset is included in a Type0-PDCCH monitoring occasion table, or the time offset is included in an expanded Type0-PDCCH monitoring occasion table.

10. The method according to claim 9, wherein based on that a bandwidth of the narrowband CORESET0 is less than or equal to a preset bandwidth, the time offset in the expanded Type0-PDCCH monitoring occasion table is equal to the time offset in the Type0-PDCCH monitoring occasion table.

11. The method according to claim 7, wherein the time offset is a time corresponding to a sum of a first offset and a first duration, the first offset is a number of time slot offsets between the start time slot of the SS/PBCH block and the start time slot of the monitoring occasion of the Type0-PDCCH or a number of time slot offsets between the start time slot of the first SS/PBCH block and the start time slot of the monitoring occasion of the first Type0-PDCCH, and the first duration is a total number of timeslots of the monitoring occasion of the Type0-PDCCH associated with a maximum number of SS/PBCH blocks.

12. The method according to claim 7, wherein based on that a reciprocal of a number of monitoring occasions of the Type0-PDCCH in a time slot is 1 or ½, the time offset is a time corresponding to a sum of a first offset and a first duration, the first offset is a number of time slot offsets between the start time slot of the SS/PBCH block and the start time slot of the monitoring occasion of the Type0-PDCCH or a number of time slot offsets between the start time slot of the first SS/PBCH block and the start time slot of the monitoring occasion of the first Type0-PDCCH, and the first duration is a total number of timeslots of the monitoring occasion of the Type0-PDCCH associated with a maximum number of SS/PBCH blocks.

13. The method according to claim 7, wherein the time offset is equal to a time offset between the start time slot of the SS/PBCH block and a start time slot of a monitoring occasion of a Type0-PDCCH, or a time offset between the start time slot of the first SS/PBCH block and a start time slot of a monitoring occasion of a first Type0-PDCCH, and the time slot index or start time slot index of the monitoring occasion of the narrowband Type0-PDCCH is equal to a time slot index or start time slot index of the monitoring occasion of the Type0-PDCCH plus one.

14. The method according to claim 7, wherein based on that a reciprocal of a number of monitoring occasions of the Type0-PDCCH in a time slot is 2, the time offset is equal to a time offset between the start time slot of the SS/PBCH block and a start time slot of a monitoring occasion of a Type0-PDCCH, or a time offset between the start time slot of the first SS/PBCH block and a start time slot of a monitoring occasion of a first Type0-PDCCH, and the time slot index or start time slot index of the monitoring occasion of the narrowband Type0-PDCCH is equal to a time slot index or start time slot index of the monitoring occasion of the Type0-PDCCH plus one.

15. The method according to claim 1, further comprising:
receiving the narrowband CORESET0 at the frequency domain resource of the narrowband CORESET0, and/or receiving a narrowband Type0-PDCCH at the monitoring occasion of the narrowband Type0-PDCCH.

16. The method according to claim 1, further comprising:
indicating presence of the narrowband CORESET0 and/or a narrowband Type0-PDCCH in a PBCH.

17. A non-transitory storage medium storing one or more programs, the one or more programs comprising computer instructions, which, when executed by a processor of a User Equipment (UE), cause the processor to:
obtain an offset between a narrowband Control Resource SET0 (CORESET0) and a CORESET0; and
determine a frequency domain resource of the narrowband CORESET0 according to the offset;
wherein the offset is an offset between a lowest PRB of the CORESET0 and a lowest PRB of narrowband CORESET0.

* * * * *